(12) United States Patent
Alan

(10) Patent No.: US 9,511,810 B2
(45) Date of Patent: *Dec. 6, 2016

(54) SEAT TUBE ASSEMBLY FOR A BICYCLE OR THE LIKE

(71) Applicant: Arc Bikes, LLC, Santa Barbara, CA (US)

(72) Inventor: Loren Lee Alan, Ventura, CA (US)

(73) Assignee: ARC BIKES, LLC., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/397,257

(22) PCT Filed: Apr. 22, 2013

(86) PCT No.: PCT/US2013/037619
§ 371 (c)(1),
(2) Date: Oct. 27, 2014

(87) PCT Pub. No.: WO2013/180849
PCT Pub. Date: Dec. 5, 2013

(65) Prior Publication Data
US 2015/0123376 A1 May 7, 2015

Related U.S. Application Data

(60) Provisional application No. 61/791,585, filed on Mar. 15, 2013, provisional application No. 61/851,061, (Continued)

(51) Int. Cl.
*B62J 1/08* (2006.01)
*B62K 3/02* (2006.01)
(Continued)

(52) U.S. Cl.
CPC .. *B62J 1/08* (2013.01); *B62K 3/02* (2013.01); *B62K 3/04* (2013.01); *B62K 19/30* (2013.01); *B62K 19/36* (2013.01)

(58) Field of Classification Search
CPC ................ B62J 1/08; B62K 3/02; B62K 3/04; B62K 19/30; B62K 19/36
(Continued)

(56) References Cited

U.S. PATENT DOCUMENTS 1,431,109 A 10/1922 William
8,807,585 B2 8/2014 Alan
(Continued)

FOREIGN PATENT DOCUMENTS

| CN | 2565712 | 8/2003 |
|---|---|---|
| CN | 102292257 | 12/2011 |

(Continued)

OTHER PUBLICATIONS

International Search Report and Written Opinion for PCT Application No. PCT/US2013/037619, mailed Jul. 23, 2013, 10 pgs.
(Continued)

*Primary Examiner* — Joseph Rocca
*Assistant Examiner* — Felicia L Brittman
(74) *Attorney, Agent, or Firm* — Foley & Lardner LLP

(57) ABSTRACT

A bicycle seat tube assembly includes an arced component, a bottom bracket positioned below the arced component, and a seat tube including a pivot attachment at a lower end of the seat tube. The arced component includes a lower curved surface with a plurality of holes. The pivot attachment is coupled to the bottom bracket so that the arced component is pivotable relative to the seat tube about the bottom bracket, resulting in multiple seat tube positions between a fully forward position and a fully back position. A locking mechanism is configured to selectively lock the seat tube to
(Continued)

the arced component. The locking mechanism includes a lock ring with a plurality of lock pins and a spring that pushes the lock ring towards the arced component. The lock ring and the spring surround the seat tube The lock ring is movable between a locked position and an unlocked position.

8 Claims, 18 Drawing Sheets

Related U.S. Application Data filed on Mar. 1, 2013, provisional application No. 61/743,635, filed on Sep. 10, 2012, provisional application No. 61/687,926, filed on May 4, 2012.

(51) Int. Cl.
*B62K 3/04* (2006.01)
*B62K 19/30* (2006.01)
*B62K 19/36* (2006.01)

(58) Field of Classification Search
USPC .......................................................... 280/274
See application file for complete search history.

(56) References Cited

U.S. PATENT DOCUMENTS

| | | | |
|---|---|---|---|
| 2003/0080594 A1* | 5/2003 | Geyer | B62J 1/00 |
| | | | 297/215.13 |
| 2005/0285368 A1 | 12/2005 | Yifrah et al. | |
| 2007/0182225 A1 | 8/2007 | Bigolin | |
| 2010/0327555 A1 | 12/2010 | Chamberlain | |
| 2011/0025015 A1* | 2/2011 | Colegrove | B62K 25/286 |
| | | | 280/283 |

FOREIGN PATENT DOCUMENTS

| | | | |
|---|---|---|---|
| CN | 102292257 A | * | 12/2011 |
| DE | 42 32 655 | | 3/1994 |
| DE | 101 36 957 | | 2/2003 |
| DE | 101 21 228 | | 11/2012 |
| GB | 10209 | | 2/1915 |
| GB | 168222 | | 9/1921 |
| IT | CL20080020 | | 3/2010 |

OTHER PUBLICATIONS

European Search Report for European Patent Application No. 13798223.7, issued Nov. 3, 2015, 7 pages.

* cited by examiner

SEAT TUBE ASSEMBLY FOR A BICYCLE OR THE LIKE

CROSS-REFERENCE TO RELATED PATENT APPLICATIONS

This application is a U.S. National Stage of International Application No. PCT/US2013/037619, filed on Apr. 22, 2013, which claims priority to U.S. Provisional Application No. 61/687,926, filed May 4, 2012, U.S. Provisional Application No. 61/743,635, filed Sep. 10, 2012, U.S. Provisional Application No. 61/851,061, filed Mar. 1, 2013, and U.S. Provisional Application No. 61/791,585, filed Mar. 15, 2013. All of the foregoing applications are incorporated herein by reference in their entirety.

BACKGROUND

The present invention relates generally to the field of seat assemblies and frames for bicycles and the like.

SUMMARY

One embodiment relates to a bicycle seat tube assembly including an arced component, a bottom bracket positioned below the arced component, and a seat tube including a pivot attachment at a lower end of the seat tube. The arced component includes a lower curved surface with a plurality of holes. The pivot attachment is coupled to the bottom bracket so that the arced component is pivotable relative to the seat tube about the bottom bracket, resulting in multiple seat tube positions between a fully forward position and a fully back position. A locking mechanism is configured to selectively lock the seat tube to the arced component at one of the seat tube positions. The locking mechanism includes a lock ring with a plurality of lock pins and a spring that pushes the lock ring towards the arced component. The lock ring and the spring surround the seat tube The lock ring is movable between a locked position in which the lock pins are inserted into the holes and an unlocked position in which the lock pins are removed from the holes and the arced component is free to pivot about the bottom bracket.

Another embodiment relates to a bicycle frame including a head tube configured to receive a handlebar, a bottom bracket, a down tube extending rearward and downward from the head tube to the bottom bracket, a top tube extending rearward form the head tube, an arced component including a forward end coupled to the top tube and a lower curved surface with a plurality of holes, and a seat tube including a pivot attachment at a lower end of the seat tube. The pivot attachment is coupled to the bottom bracket so that the arced component is pivotable relative to the seat tube about the bottom bracket, resulting in multiple seat tube positions between a fully forward position and a fully back position. A locking mechanism is configured to selectively lock the seat tube to the arced component at one of the seat tube positions. The locking mechanism includes a lock ring with a plurality of lock pins and a first spring that pushes the lock ring towards the arced component. The lock ring and the first spring surround the seat tube The lock ring is movable between a locked position in which the lock pins are inserted into the holes and an unlocked position in which the lock pins are removed from the holes and the arced component is free to pivot about the bottom bracket. A second spring is coupled between the head tube and the seat tube to pull the seat tube towards the fully forward position. The second spring is located within the top tube.

Another embodiment relates to a bicycle including a frame including a head tube, a top tube extending rearward from the head tube, an arced component having a forward end coupled to the top tube and a lower curved surface with a plurality of holes, and a bottom bracket positioned below the arced component and a seat tube including a pivot attachment at a lower end of the seat tube. The pivot attachment is coupled to the bottom bracket so that the frame is pivotable relative to the seat tube about the bottom bracket, resulting in multiple seat tube positions between a fully forward position and a fully back position. A locking mechanism is configured to selectively lock the seat tube to the arced component at one of the seat tube positions. The locking mechanism includes a lock ring with a plurality of lock pins and a first spring that pushes the lock ring towards the arced component. The lock ring and the first spring surround the seat tube The lock ring is movable between a locked position in which the lock pins are inserted into the holes and an unlocked position in which the lock pins are removed from the holes and the frame is free to pivot about the bottom bracket. A second spring is coupled between the head tube and the seat tube to pull the seat tube towards the fully forward position. The second spring is located within the top tube. A saddle is movably coupled to the seat tube so that the saddle is adjustable up and down relative to the seat tube. A front wheel is coupled to the frame, a rear wheel is coupled to the frame, and a handlebar is coupled to the head tube. With the lock ring in the unlocked position, the seat tube remains stationary and the frame pivots to follow the terrain on which the bicycle is being ridden Other embodiments relate to a bicycle frame where the seat tube assembly remains in a fixed position with respect gravity and the riders' most efficient body position and the remainder of the frame assembly is allowed to rotate about the bottom bracket. In some embodiments, the frame includes an arced component that is designed so that it guides the seat tube assembly within its range and provides a radiused surface to mount removable insert strips. In some embodiments, insert strips are designed using non concentric radii so that one arc design can be used for any size bicycle frame. The insert strips may have slotted positioning pockets that accept stepped and tapered locking pins and allow the pins to be misaligned in frame assembly without compromising the stability of the locking mechanism. The insert strips may have an inside wall that can be precision fitted to the seat tube flats maintaining a slip fit required for accurate and sustained locking of the frame/seat tube relation. The seat tube assembly may be integrated with a remotely controlled hydraulic seat post assembly that allows the rider to raise and lower the saddle independently or in conjunction with the rotation of the frame. In some embodiments, the frame assembly uses an extension spring or optional hydraulic assembly to pull the frame towards the fixed seat tube assembly when the rider chooses to adapt the frame geometry for any terrain conditions they encounter (e.g. up or down hill) or to benefit the rider's bio mechanical position.

Other embodiments relate to a fixed seat tube assembly and locking mechanism that provides a way for the saddle to remain fixed while the rest of the frame and associated wheels, etc to follow the terrain thus allowing the rider to maintain their maximum power position by virtue of not moving with respect to gravity and their predetermined power position.

Other embodiments relate to a fixed seat tube assembly and locking mechanism that allows a rider to fine tune their riding position by pulling or pushing the frame toward or away from the fixed seat tube assembly. In some embodiments, a cable or hydraulic assembly allows the rider to disengage the frame from the seat tube assembly as the rider determines using a control typically mounted on the handlebars. The cable assembly may include a mechanical advantage design that lessens the required on the thumb lever. A lock ring may be disengaged and engaged by the cable assembly in a symmetrical and even force based on the cable pulley system. A coaxial mounted extension spring may be housed inside the top tube and damped by a tube liner that pulls the frame toward the fixed seat tube or allows the frame to move freely fore and aft of the fixed seat tube as desired without the need of the rider to push or pull in order to change the frame/seat tube relationship. In some embodiments, a frame design made up of "V" shaped tubes extending from each end of the arc to the bottom bracket to form a solid structure maintains the integrity of the locking mechanisms. In some embodiments, an eccentric bushing where the rear axle passes allows for the precise rear wheel alignment to the arc leading to a shorter overall wheelbase. In some embodiments, a spring steel or hard bearing material lower bottom bracket strap holds the seat tube assembly against the bottom bracket while allowing a smooth pivot point for the frame to rotate with respect to the fixed seat tube. A second spring steel or hard bearing material may be sandwiched between the bottom bracket and the seat tube assemblies' lower yoke providing a hard running surface between the typically softer frame materials. A shock absorbing and height adjusting assembly may be used, allowing for precision adjusting of the head tube angle and shock relief of the front section of a frame. In some embodiments, a spring retainer ring allows for the tension adjusting of the compression spring that pushes the locking ring with it's pins up into the insert strips. Locking pins designed with a taper as well as a step may be used to allow for fast and accurate insertion in and out of their slotted receptacle pockets. As the pins seat their tapered lower section is forced to wedge into the insert strips creating a solid fit that mimics the weld used on a traditional bike Another embodiment relates to a method for riding or racing a bicycle that uses physics and adaptable frame geometry design to provide a way for a rider to maintain their most powerful and/or most comfortable position by allowing the seat tube assembly to remain fixed with respect to gravity and a riders' leg/body position while the remaining frame geometry is allowed to pivot about the bottom bracket at the direction of the rider thus adapting to various terrain conditions e.g. up or down hill. If it has been determined that a rider's most efficient power position with respect to the frame geometry on flat ground then changing the terrain would not alter that ultimate position. Because a traditional bicycle frame is "fixed" it stands to reason that the most efficient position is diminished when any terrain other than flat is encountered. The method described here allows for the rider to maintain that most efficient position by keeping the seat tube fixed with respect to gravity and the riders' body position while encountering variable terrain.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

As shown in the Figures, a bicycle frame 100 as described herein addresses the problem that all riders have when they encounter changing terrains while riding. The typical bike frame is primarily designed to be used most efficiently on flat terrain. Even if a frame is custom fitted to a specific rider it is done based on flat ground. The fact that a seat tube on industry standard frames is fixed at a particular angle (typically between 70 and 74 degrees) is an admission that it is an "average" of all terrains that it will encounter. The bicycle frame 100 provides a seat tube 105 that can be indexed on the fly at varying angles depending on the riders' requirements. This means that a rider can quickly move and lock (index) the seat tube 105 to a position that provides them with the greatest efficiency at that moment during the ride. This is due to the fact that there is one physical position for any given rider that produces the greatest power to the cranks 110 and that position changes as the terrain changes.

Figure 1:
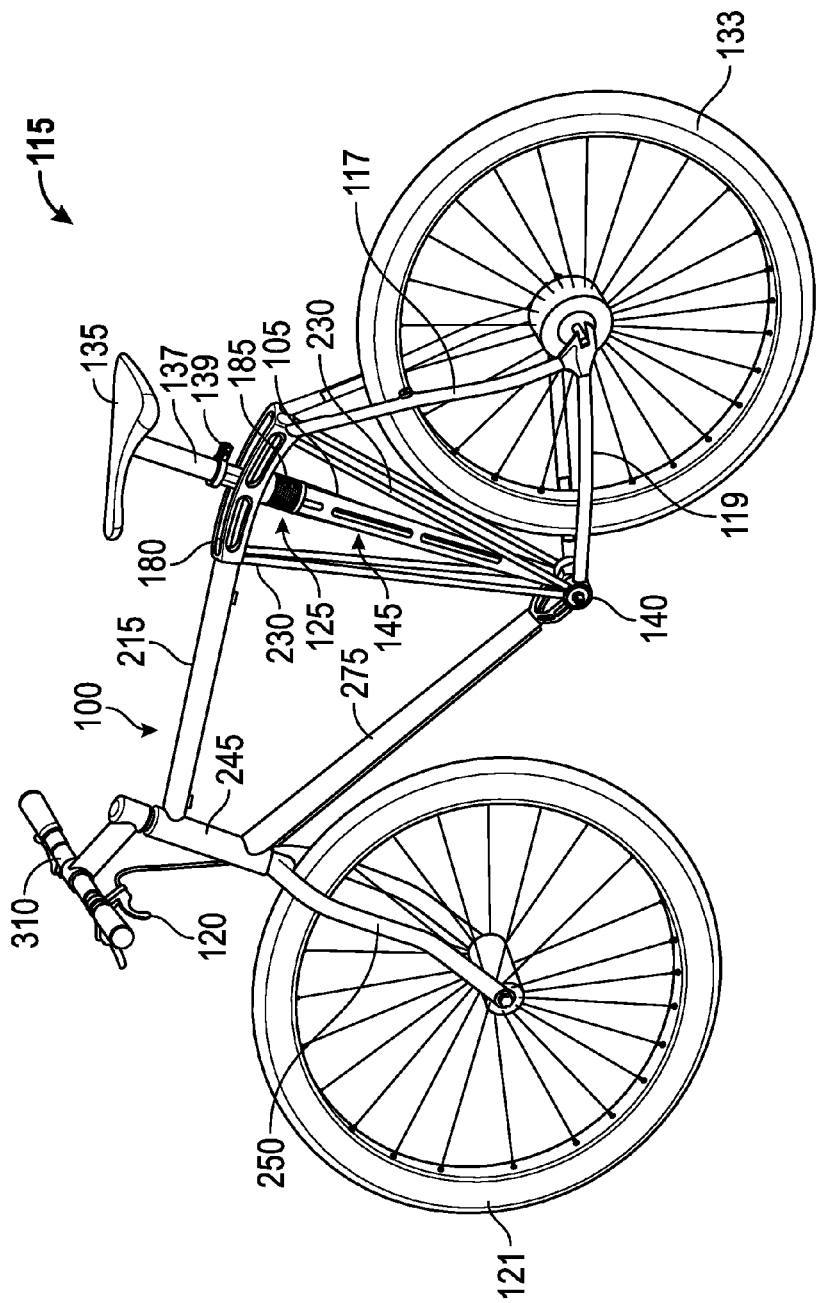
FIG. 1 is a perspective view of a bicycle according to an exemplary embodiment.
Figure 2:
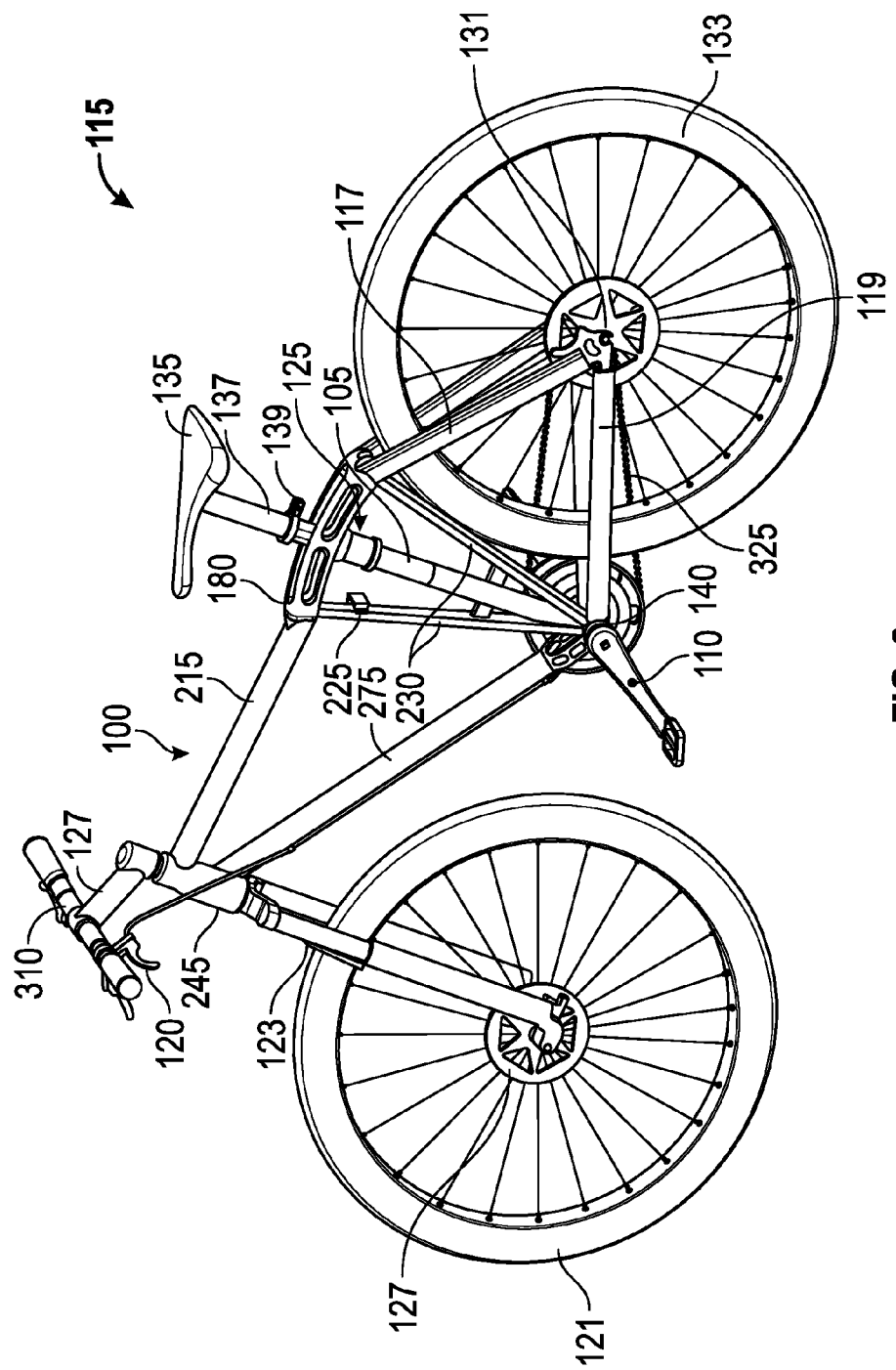
FIG. 2 is a perspective view of a bicycle according to an exemplary embodiment.

An exemplary embodiment of a bicycle 115 including the frame 100 is illustrated in FIGS. 1-2. As shown in FIG. 2, the frame 100 includes a head tube 245, a top tube 215, a down tube 275, the seat tube 105, a bottom bracket 140, an arced component 180, four support struts 230, a seat stay 117, and a chain stay 119. A front wheel 121 is supported by a suspension fork 123. The front wheel is braked by a disc brake 127. The handlebars 310 include a stem 129. A drop out 131 allows a rear wheel 133 to be removed from the frame 100. The seat 135 is supported by a seat post 137 and secured by a seat post clamp 139.

The method that allows the rider to change the riding position is built into the design of the frame 100. This method must be practical and safe for it to become a realistic standard in the bicycle industry. The following steps are used to provide the "method" that the frame 100 and bicycle 115 use to obtain maximum efficiency. The rider traveling on a road or trail uses a thumb lever 120 to release a locking mechanism 125 that holds the pivoting seat tube 105 in place (step 1). The seat tube 105 is spring loaded forward by a spring 130 so that it is easily positioned by the rider even when moving uphill (step 2). As the rider encounters a particular terrain, he or she unlocks and positions the seat tube 105 to the position that they determine to be the most efficient or comfortable (step 3). When the thumb lever 120 is released the locking mechanism 125 latches to secure the seat tube 105 (step 4). The ability of the rider to quickly and positively position themselves at their most efficient or comfortable location provides the method for maximum riding performance.

Figure 3:
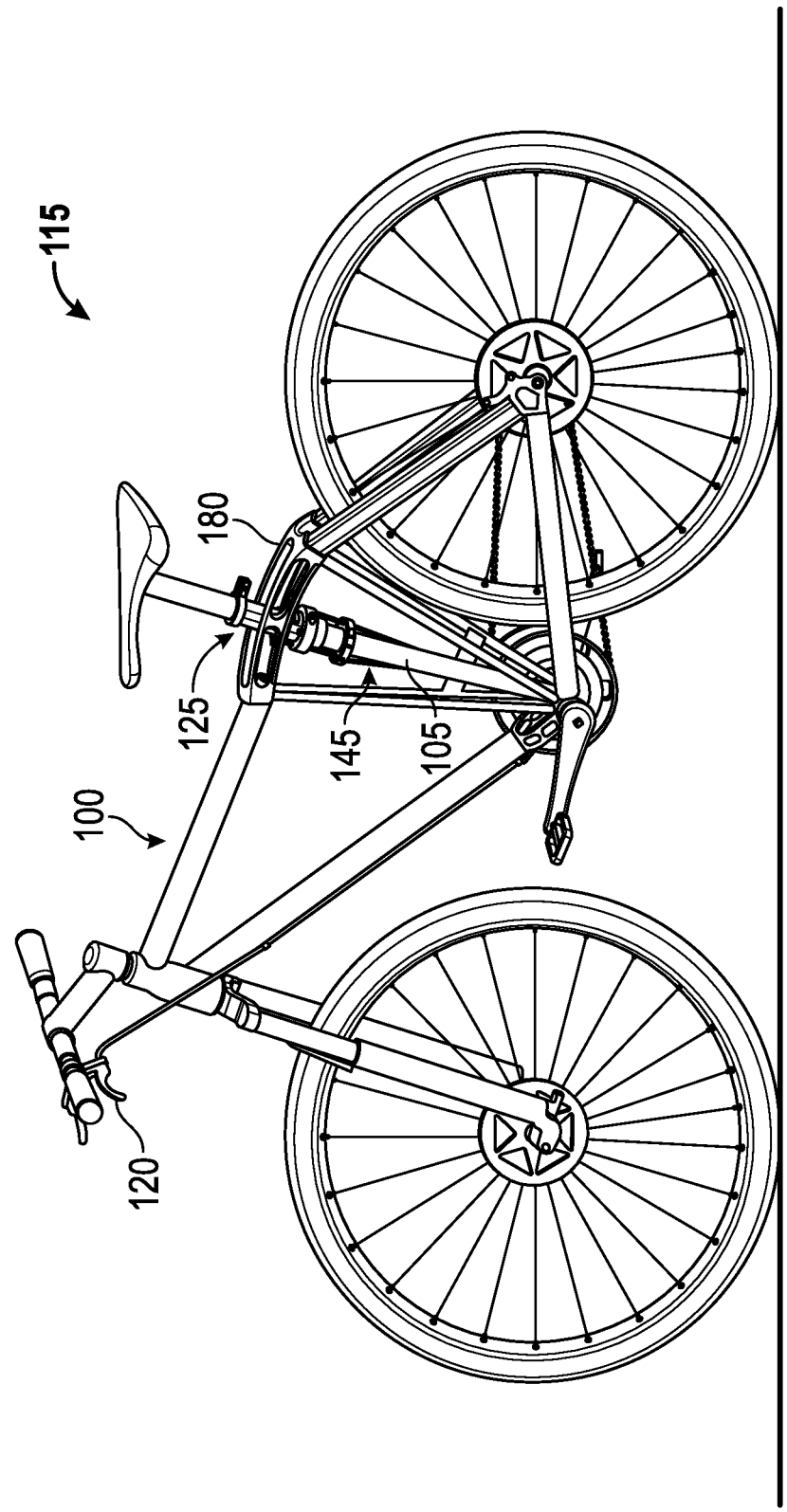
FIG. 3 is a perspective view of the bicycle of FIG. 2 on flat ground.
Figure 4:
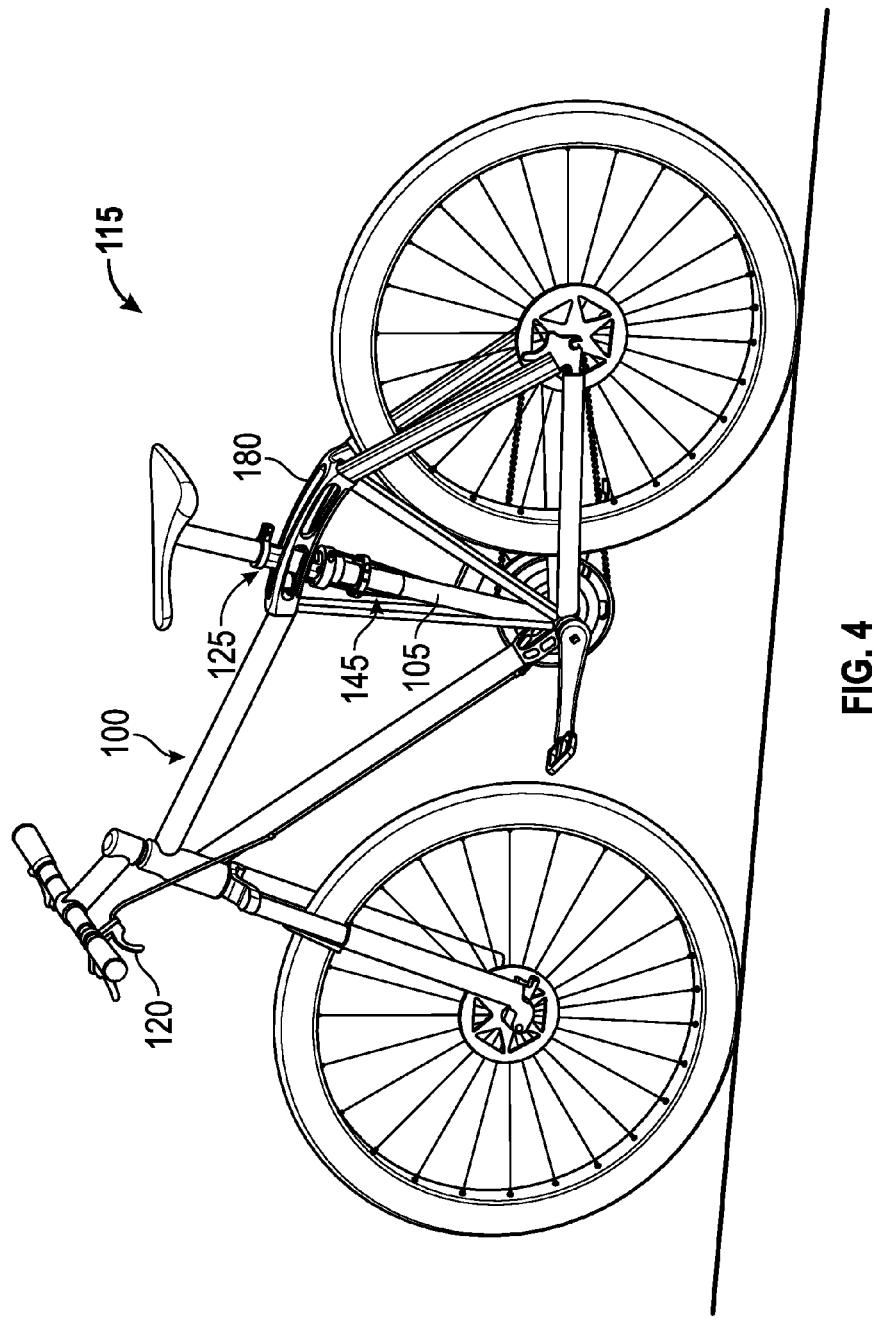
FIG. 4 is a perspective of the bicycle of FIG. 2 going up a moderate hill.
Figure 5:
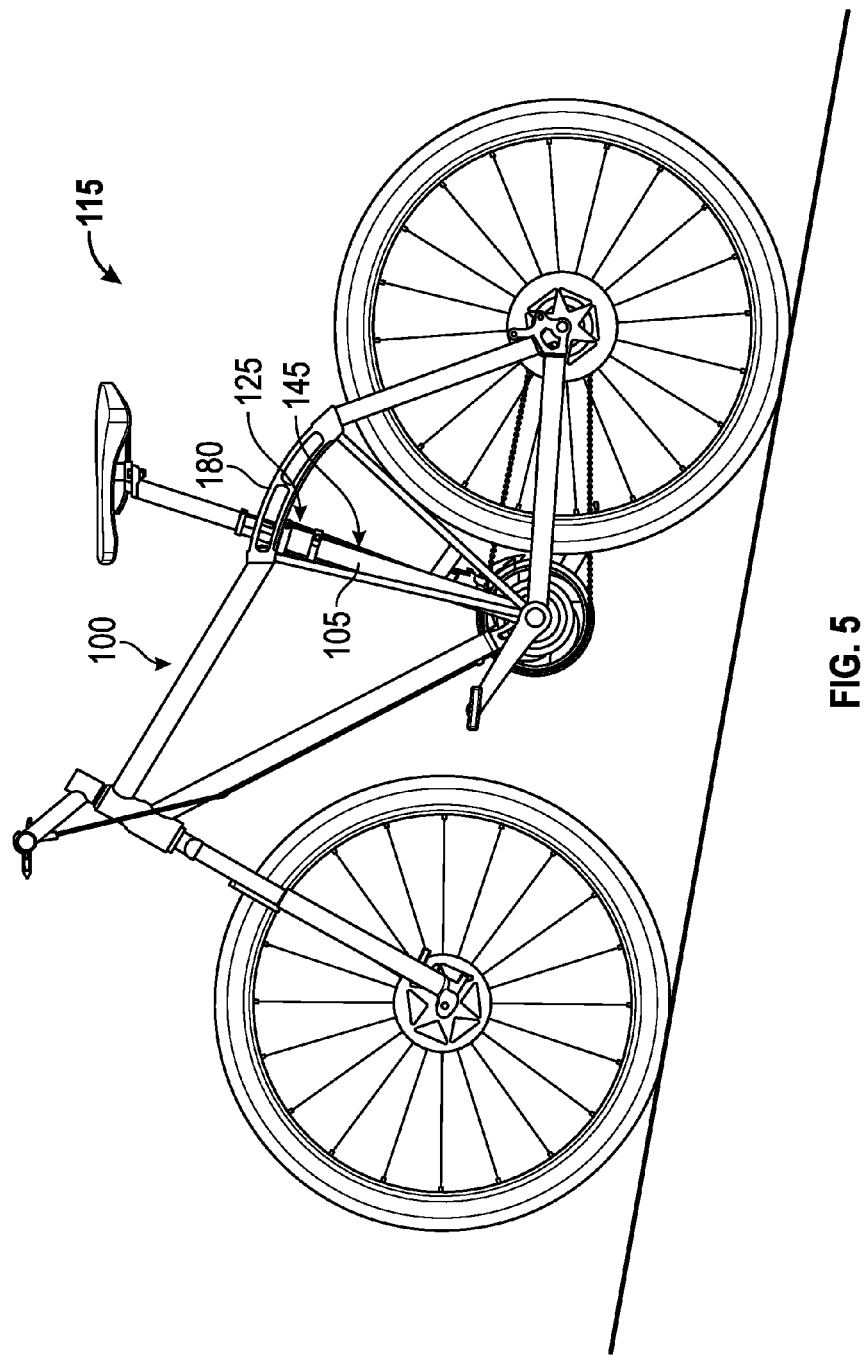
FIG. 5 is a perspective of the bicycle of FIG. 2 going up a steep hill.
Figure 6:
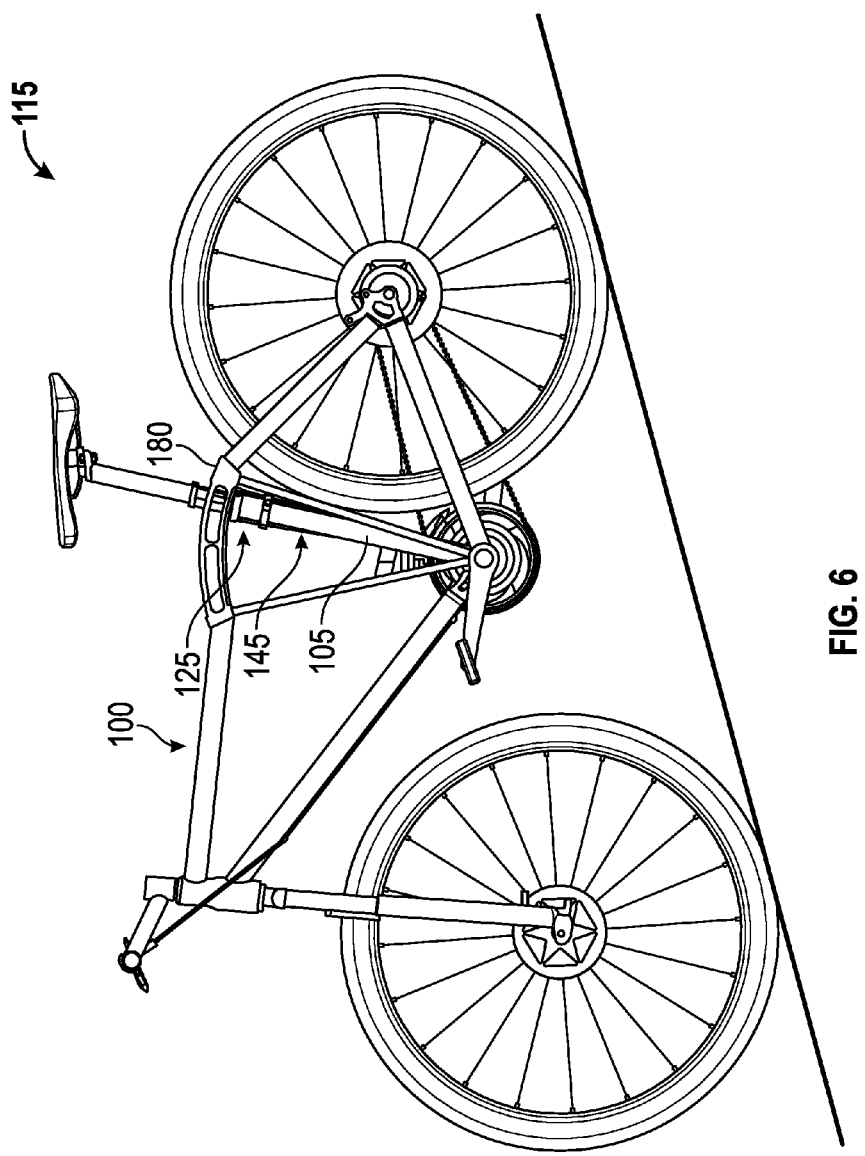
FIG. 6 is a perspective of the bicycle of FIG. 2 going down a steep hill.

For reference, FIGS. 5-6 show the positions of the frame 100 with respect to the fixed seat tube 105 at the limits of its range. FIG. 3 shows the frame 100 with the bicycle 115 on flat ground and the seat tube 105 at a mid range position. FIG. 4 shows the frame 100 with the bicycle going up a moderate hill and the seat tube 105 at a partially forward position. FIG. 5 shows the frame 100 with the bicycle 115 going up a steep hill and the seat tube 105 at a fully forward position. FIG. 6 shows the frame 100 with the bicycle 115 going down a steep hill and the seat tube 105 at a fully back position. Note that the seat 135 and seat tube 105 remain fixed while the frame 100 pivots about the bottom bracket 140 compensating for the change in terrain.

Figure 7:
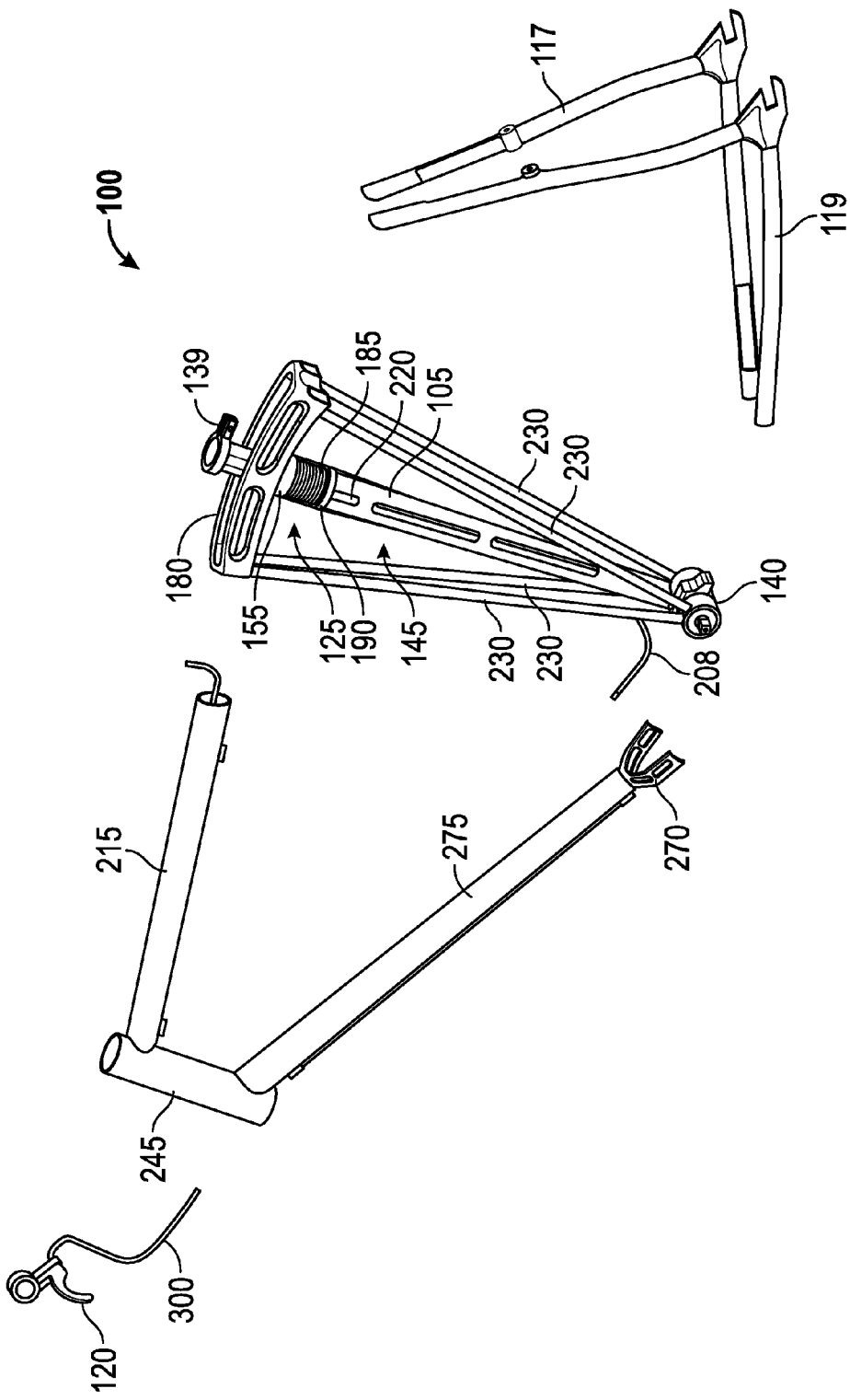
FIG. 7 is an exploded view of a bicycle frame according to an exemplary embodiment.
Figure 8:
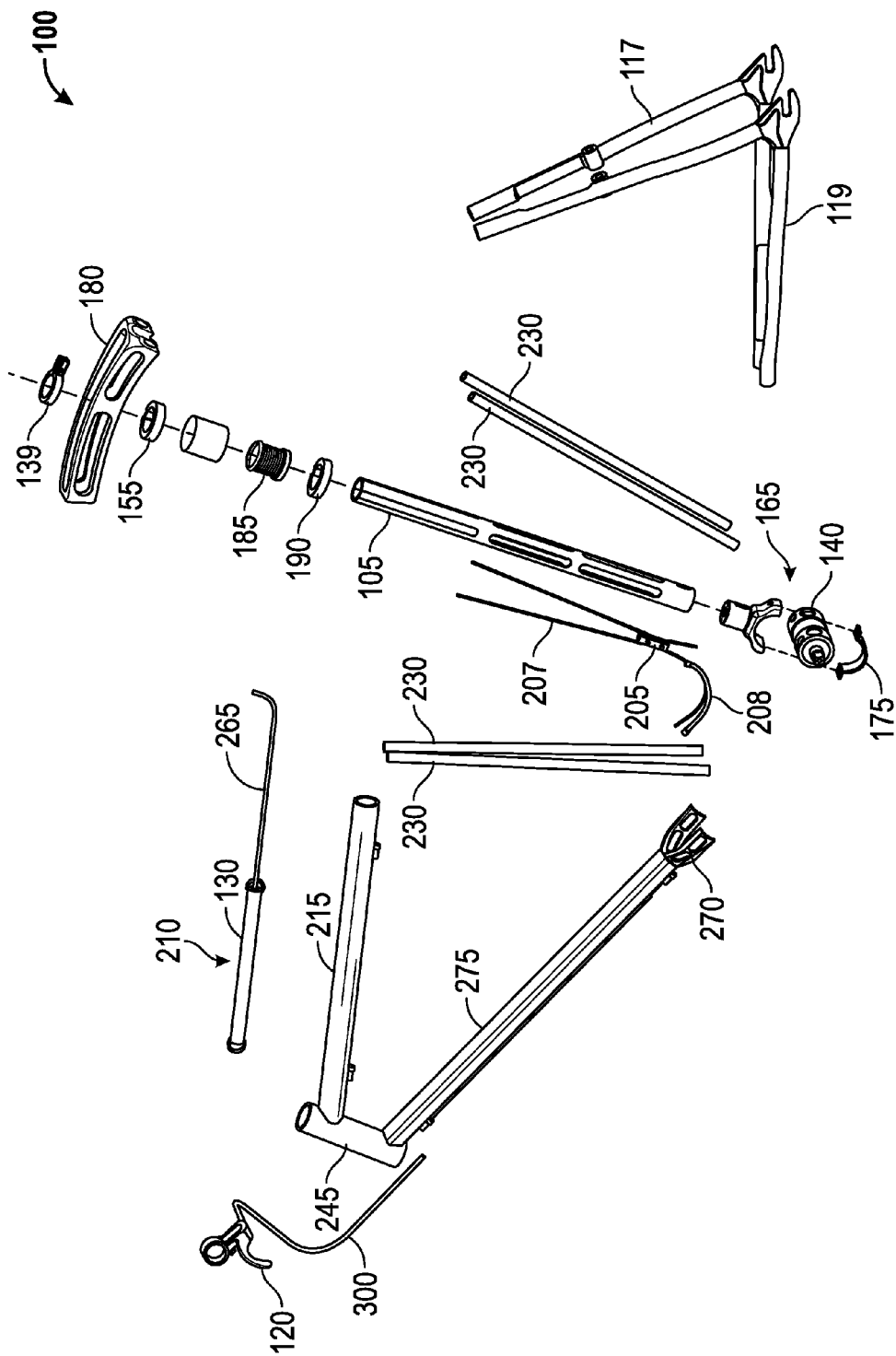
FIG. 8 is an exploded view of a bicycle frame according to an exemplary embodiment.
Figure 9:
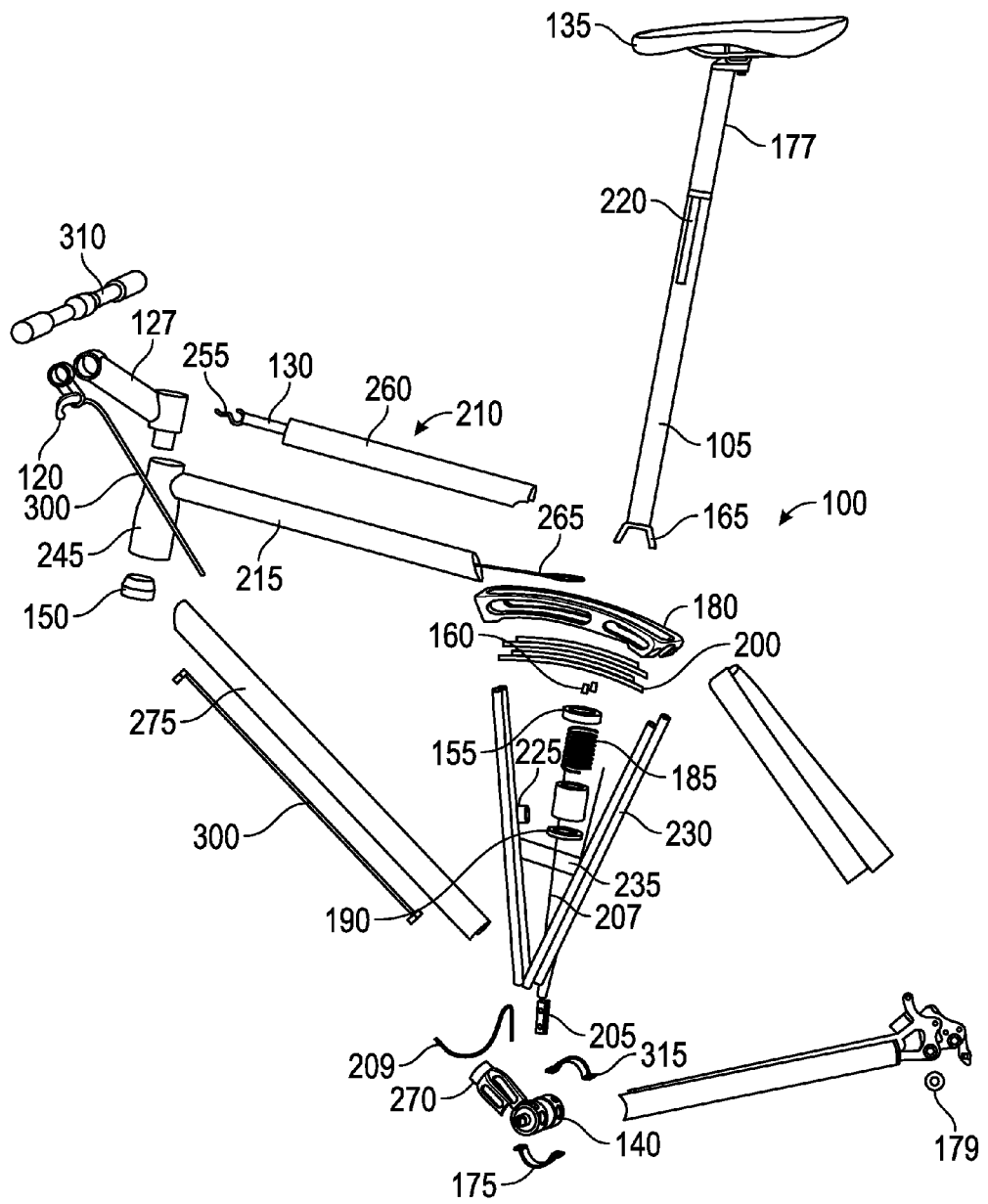
FIG. 9 is an exploded view of a bicycle frame according to an exemplary embodiment.
Figure 10:
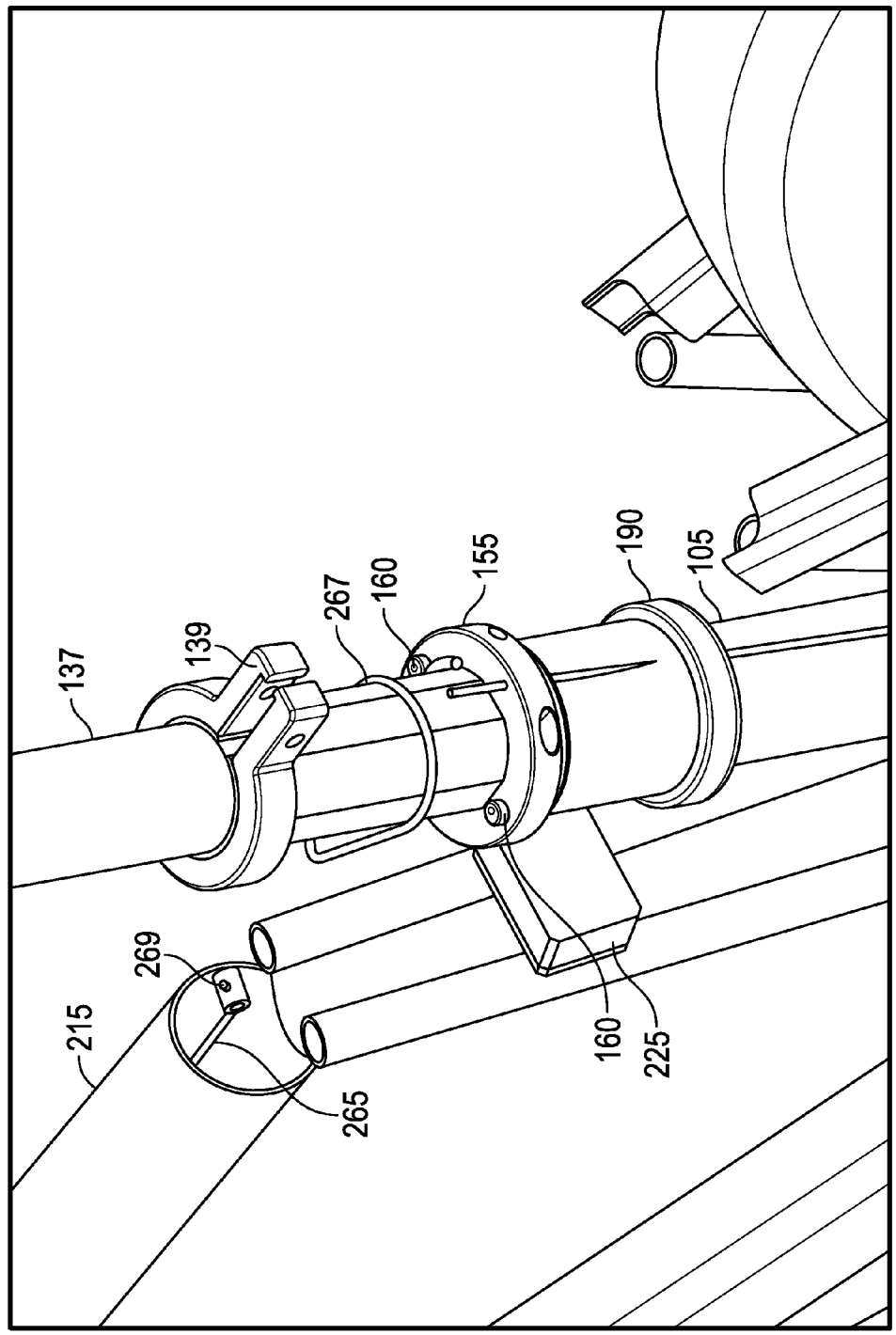
FIG. 10 is a perspective view of a portion of a bicycle frame, with some components omitted for clarity.

Various exemplary embodiments of the frame 100 are shown in exploded views in FIGS. 7-9. The bicycle frame 100 (mountain, city, road, triathlon, beach, etc) includes an integrated seat tube assembly 145 based on the ability for the seat tube assembly 145 to index into the best and/or most efficient position as determined by the rider during operation. The seat tube 105 is released, indexed, and locked into place by an assembly and mechanism 125 designed specifically to hold solid the assembly 145 while riding the bicycle 115. The locking mechanism 125 is designed to "wedge" into place so that a locking ring 155 and pins 160 (shown in FIG. 10) do not slip or move during the bicycle's operation. The locking mechanism 125 is operated via a cable release lever 120 conveniently located to the rider. The seat tube assemblies' lower connection 165 pivots around the centerline axis of the bottom bracket 140 so that the height of the seat 135 does not change during or after the indexing operation is performed. The upper bottom bracket clamp half 170 is held in place with a spring steel lower clamp 175 that allows for the smooth indexing of the seat tube 105. As shown in FIG. 9, a remotely controlled hydraulic seat post assembly 177 allows the rider to raise and lower the saddle 135 independently or in conjunction with the rotation of the frame 100. An eccentric bushing 179, where the rear axle passes, allows for the precise rear wheel alignment to the arc 180, leading to a shorter overall wheelbase.

As shown in FIGS. 11-14, the bicycle frame 100 includes an arced component 180 that furnishes the seat tube locking pins 160 a matching radius for the latching. A spring 185 is slid onto a ring 190 and clamped in place along the seat tube 105 and pushes the locking ring 155 and pins 160 upward engaging holes 195 in the underside of the arc, thus holding the seat tube assembly in place until released again by the rider to another position along the arc 180. The seat tube 105 can index into holes 195 laid out along the underside of the arc 180 approximately every 2 degrees for the length of the arc 180. Tapered locking pins 160 are used so that when the lock ring 155 is pushed into the mating holes 195 in the bottom of the insert strips 200, the lower taper of the pins 160 will wedge into the holes 195 creating a solid hold so that the seat tube 105 does not wiggle when the bike 115 is ridden.

Different bicycle styles (e.g. mountain, road) may use arcs 180 of different lengths and radii depending on the design criteria of the particular frame. The underside of the arc 180 may include an insert 200 of a harder material for the locking pins 160 to increase the life of the locking mechanism 125. A pull force reducing pulley mechanism 205 (including cables 207 and 209) is used to lessen the force necessary to release the pins 160 from the arc 180. The cable or hydraulic release mechanism 300 is designed so that there is equal and symmetrical pull on the lock ring 155 to insure positive locking of the pins 160. Slide inserts may be used on some models inside the arc's surfaces to lessen the friction between the seat tube 105 and the arc 180. When released the seat tube 105 is pulled toward the front of the bicycle using a spring and cable assembly 210 located inside a top tube 215 of the frame 100. The frame 100 may be made using a variety of state of the art materials, and the design is not dependant on any single material. The frame 100 accepts additional industry standard bicycle components typically used to make up the completed bicycle 115.

Figure 11:
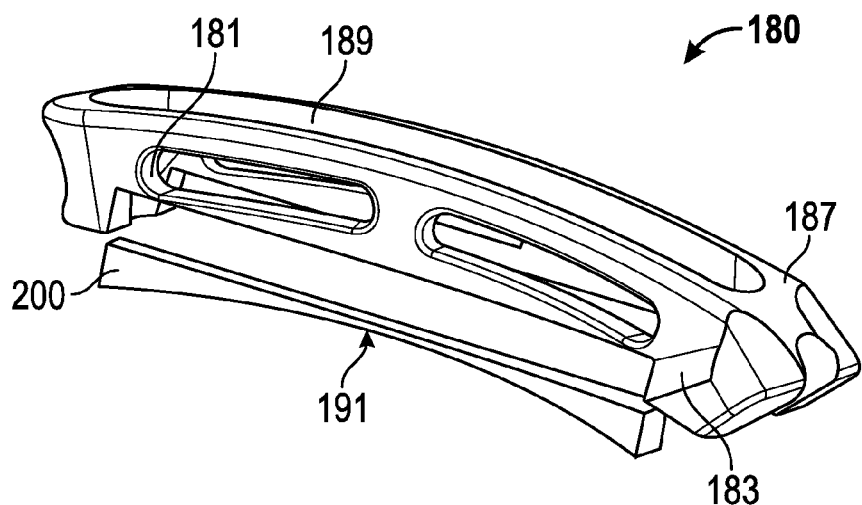
FIG. 11 is an exploded view of an arced component of a bicycle frame according to an exemplary embodiment.
Figure 12:
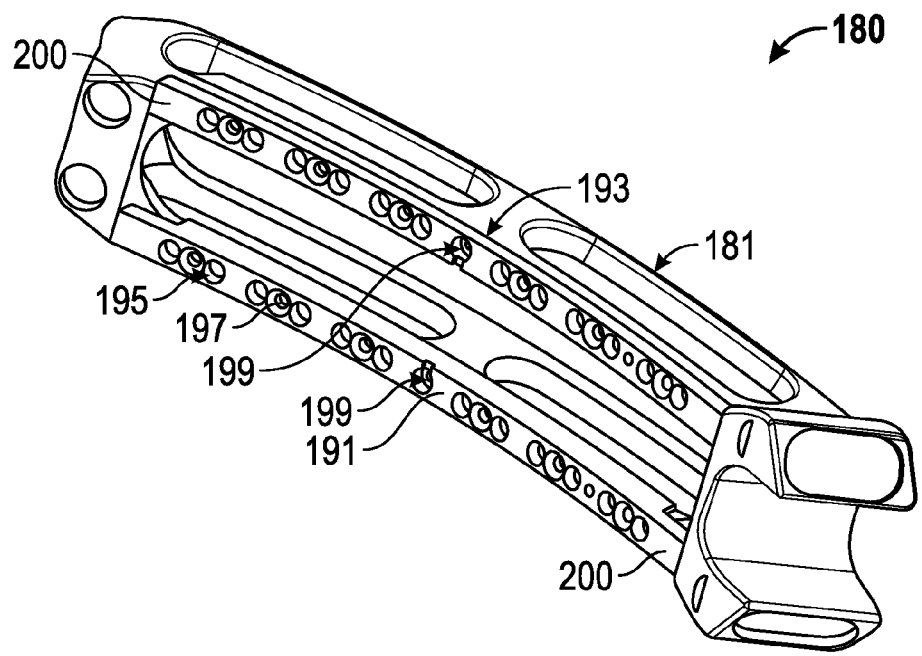
FIG. 12 is a bottom perspective view of an arced component of a bicycle frame according to an exemplary embodiment.

FIGS. 11 and 12 illustrate the arc 180. The arc body 181 is formed of two halves 183 and 187. The halves 183 and 187 are pinned and bolted together. The halves 183 and 187 can be cast with better precision. The arc 180 defines a tube guide slot 189. The radius plate modules or inserts 200 are made from a hard material like titanium or silicon carbide, eliminating the need for pressed in steel strips. The bottom radius 191 of the insert 200 is changed for different bike sizes. The radius 191 determines the size of the bike (e.g., a 16" radius results in a 16" bike). The top radius 193 of the insert 200 matches the inner radius of the arc body 181. The inserts 200 are removable. The arc body 181 is the same for all bikes (e.g., for all mountain bike sizes) because the inserts 200 are matched to the bike size. Locking holes 195, slots, or teeth are formed in the insert 200. The inserts 200 also include mounting holes 197 and registration slots 199.

One of the main components of all of the bikes is the arced component 180 at the top of the indexing seat tube assembly and mechanism. The arc 180 may be made in modular sections that allow for easier manufacturing and design flexibility. The arced section 180 is used as a guide for the seat tube 105 and maintains a tight fit of all the locking components. The lower module 200 that contains the radius where the locking ring 155 attaches may be made so that it can be replaced if damaged without the need to replace the entire arc 180. This module 200 may be made of a stronger material such as steel, titanium, or silicon carbide that eliminates the need for a pressed in insert into the bottom of the arc 180 for rigidity of the locking mechanism 125. The radius plates 200 are further used to allow one arc size to fit all bike sizes with only the need to use the correct radius plate 200 to match the size bike being built. The radius plates 200 contain the index holes 195 or teeth that accept the pins 160 or teeth of the lock ring 155. If the radius plates 200 are damaged or worn only they need to be replaced instead of the entire arc 180.

A removable insert strip 200 that attaches to the underside of the arc 180 allows for the arc 180 to be the same for all size bikes. The different size insert strips 200 have a top radius that is always the same and match the bottom radius of the arc 180 but a lower radius that varies depending on the size bike it is being used with. Because the various bike sizes require that the final bottom radius of the arc's insert strip 200 where the lock mechanism 125 slides is a set distance from the middle of the bottom bracket 140 (e.g. 17" radius for a 17" frame), it is efficient to have a design where the same arc body 181 can be used for all bikes. The range of the seat tube movement within the arc 180 may be controlled with stops or the dimensions of the arc 180.

Figure 13:
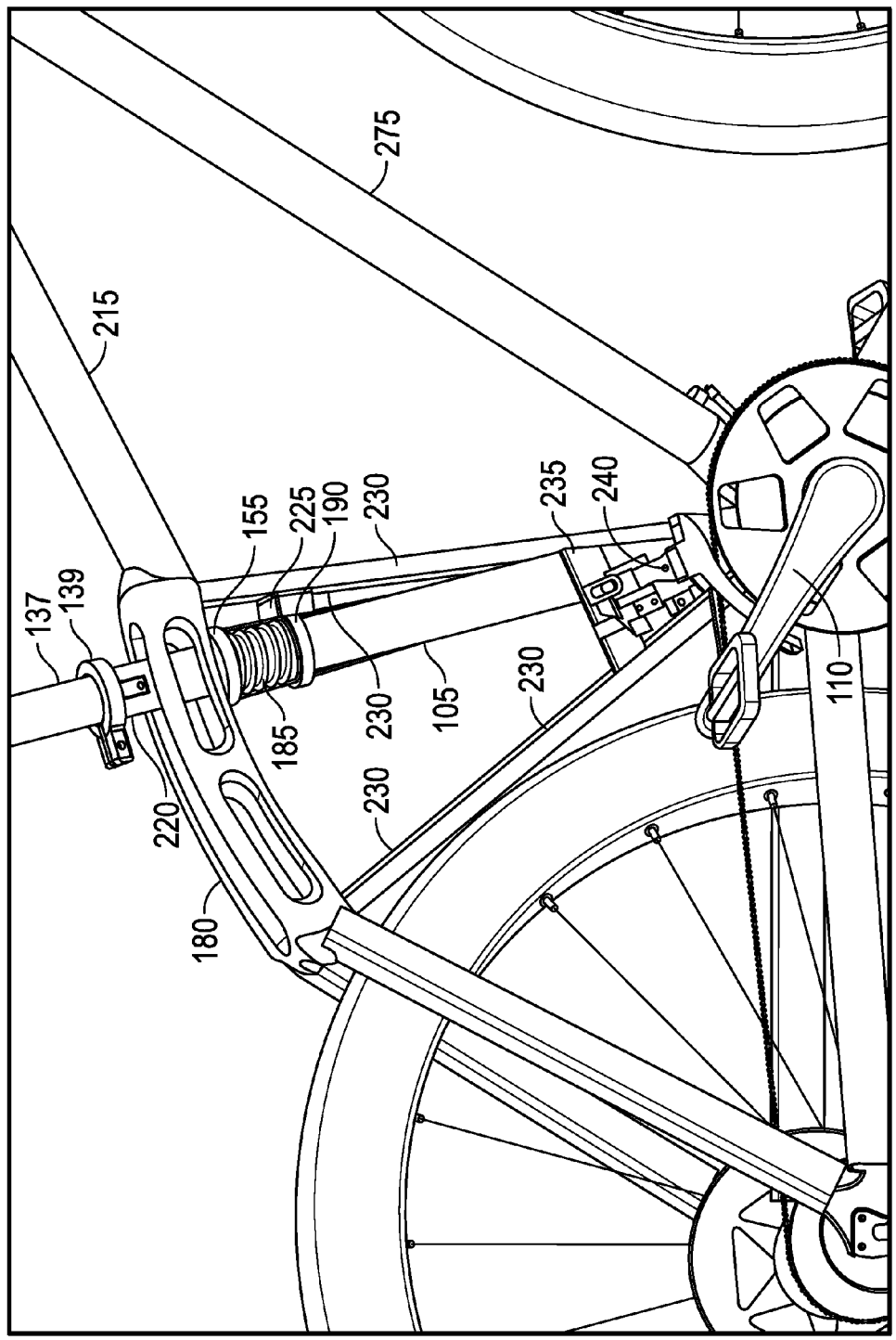
FIG. 13 is a perspective view of a portion of a bicycle frame according to an exemplary embodiment.
Figure 14:
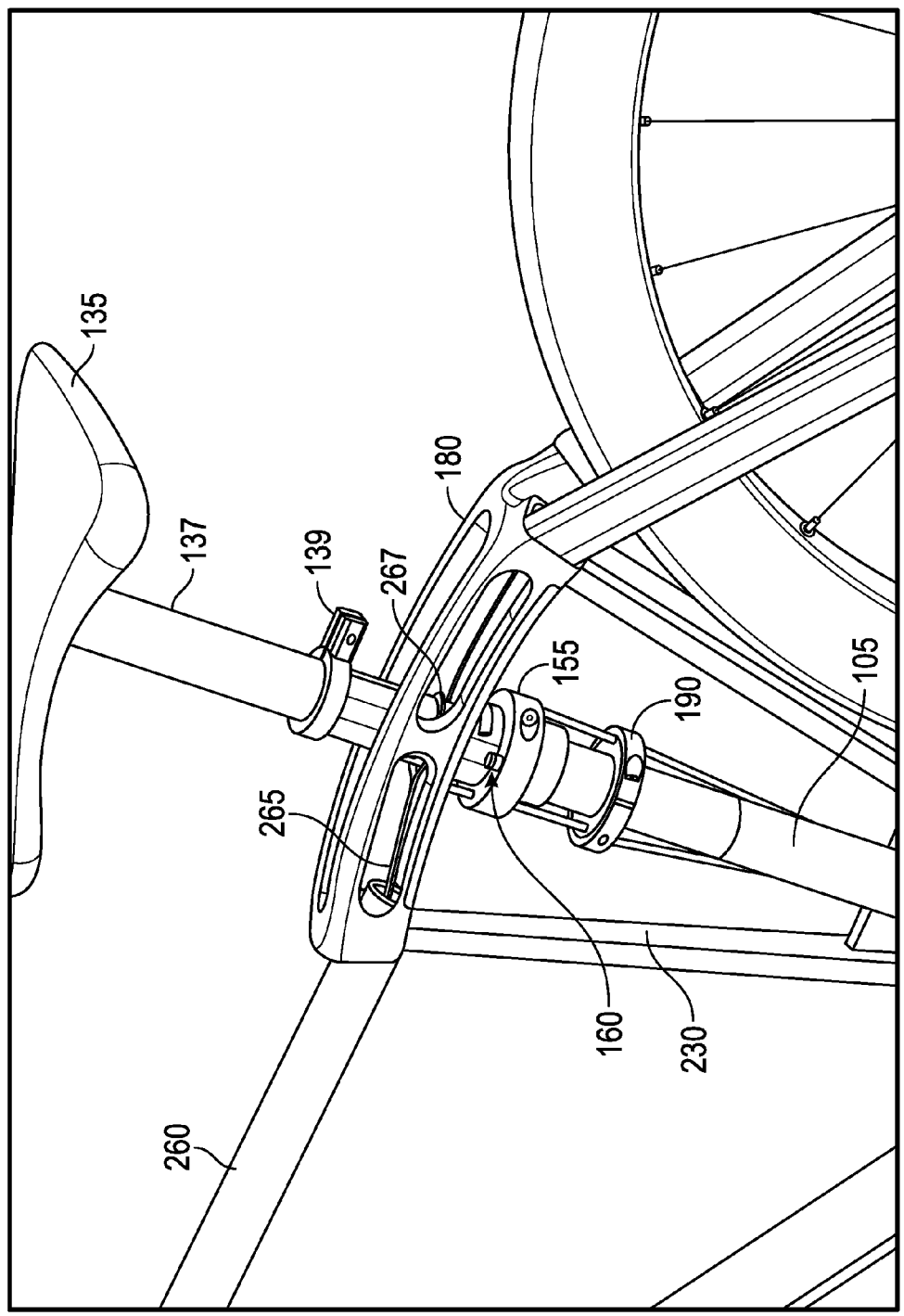
FIG. 14 is a perspective view of a portion of the bicycle frame of FIG. 13.
Figure 15:
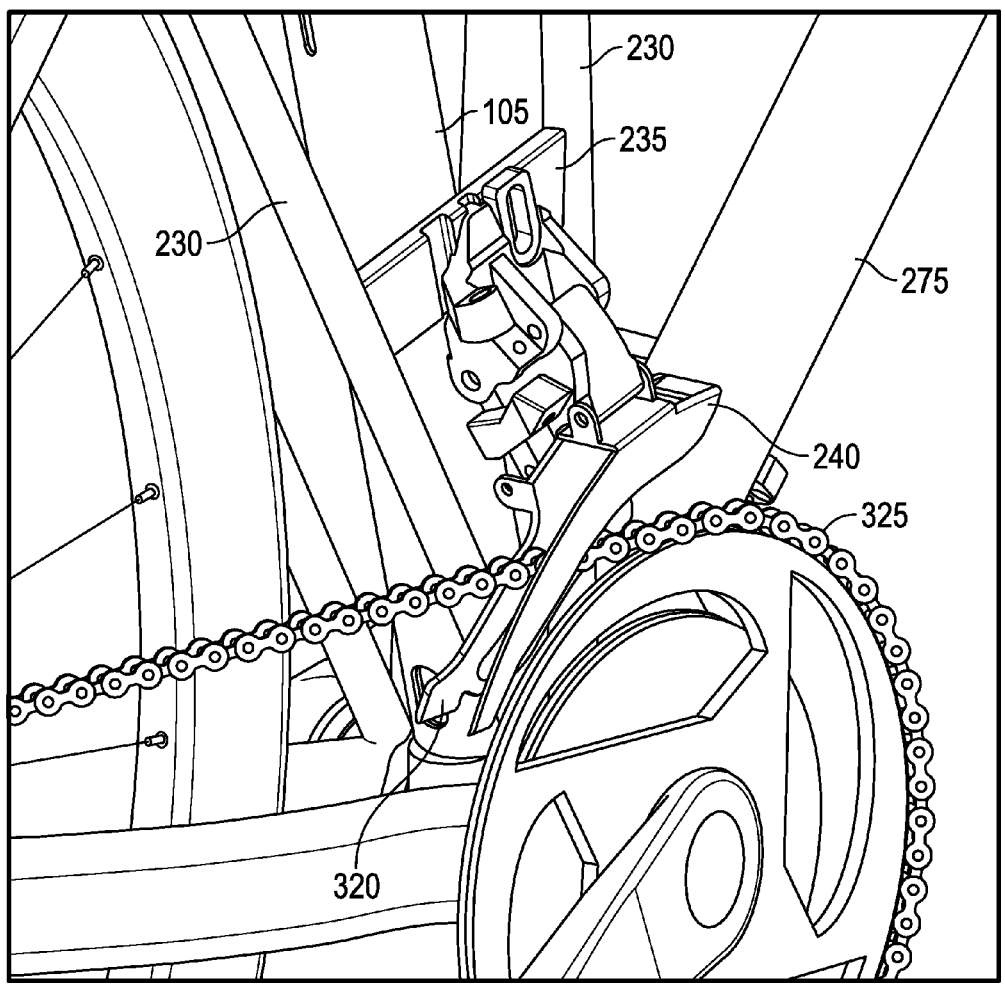
FIG. 15 is a perspective view of a portion of the bicycle frame of FIG. 13.

As shown in FIG. 13, the seat tube 105 uses machined flats 220 about the tube 105 that keep the locking ring 155 from rotating or twisting during operation. A visco-elastic shock dampening material or pad 225 is mounted in a location between the spring loaded seat tube assemblies locking mechanism 125 and a forward arc structure 230 to protect the user or any person from potential injury. The lock pins 160 may be slightly offset so that they are forced into a wedging connection into the arc's lower mating holes 195. This will hold the locking mechanism 125 in a much tighter bond. The clamp 190 is used to adjust the tension of the push up spring 185. The V shaped support struts 230 add rigidity to the entire frame 100 as well as support and stability to the arc 180. As shown in FIG. 15, a bracket 235 that accommodates a bicycle industry standard front derailleur 240 is mounted between the right side V supports 230 in a way that allows for the seat tube 105 to move freely. If a front derailleur 240 is required, it is designed with an open lower cage 320 that allows the chain 325 to move without contact. This derailleur design also allows for its removal from the frame 100 without the need to separate the chain 325.

As shown in FIG. 9, a threaded insert 150 located at the bottom of a head tube 245 that allows fine tuning of the head tube length for proper fit of the fork 250 into the head tube 245. This insert 150 can also be used to change the angle of the head tube 245 with respect to level ground. A shock absorbing cartridge may be integrated into the head tube adjustment ring 150 of road or triathlon bike frames to control fatigue of the front sections of the frame 100 as well as the rider's upper body.

Figure 16:
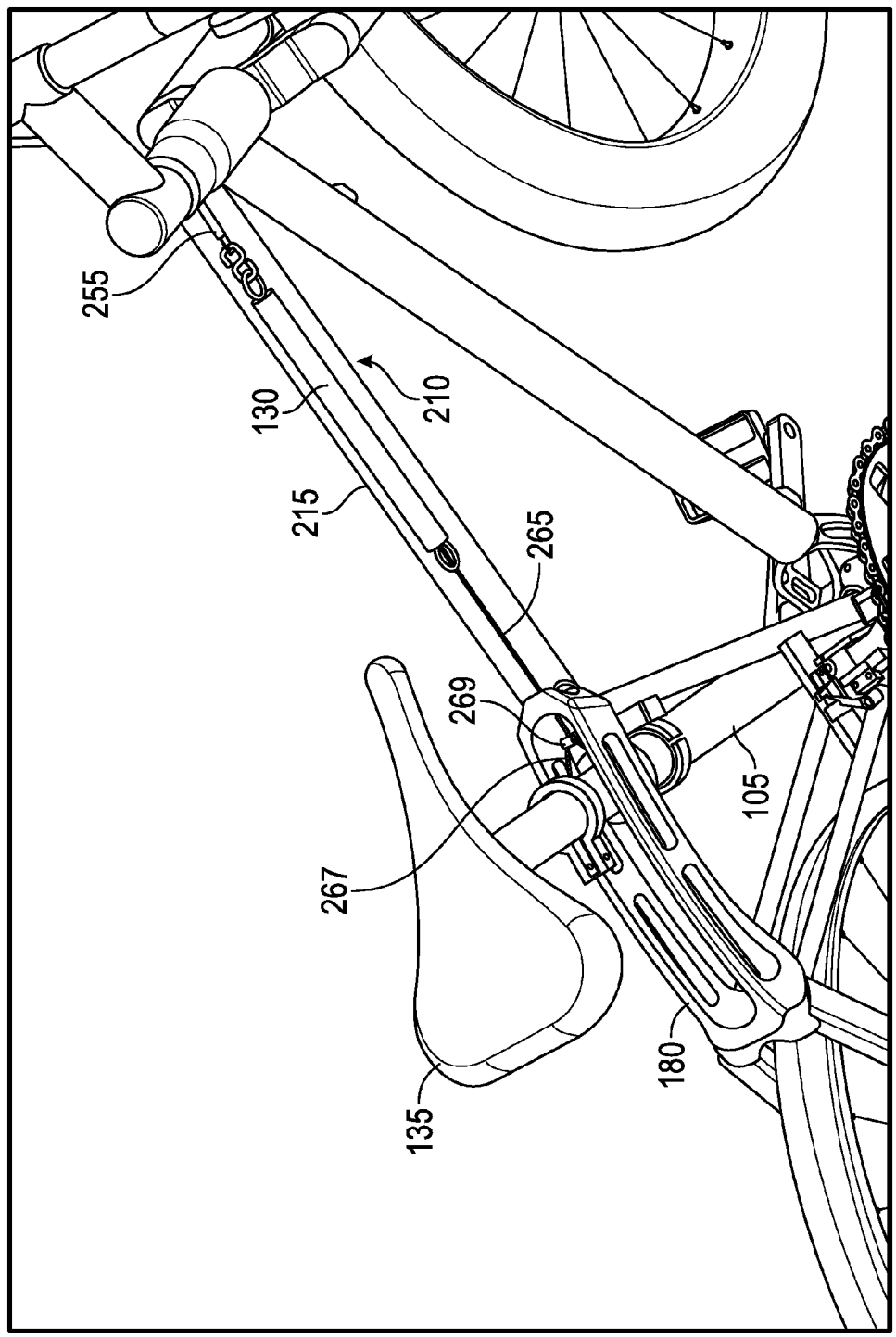
FIG. 16 is a perspective view of a portion of the bicycle frame of FIG. 13, with some components omitted for clarity.

As shown in FIG. 16, the seat pull spring assembly 210 is mounted coaxial with the top tube 215 so that it can be pulled back and forth as required. The assembly 210 is anchored (e.g., by a flat head bolt 255) to the head tube 245 for maximum stability. The assembly 210 is covered with a plastic or rubber material tube liner 260 to lessen noise during use. The assembly 210 is anchored to the seat tube 105 via a quick release wire or cable 265 around the circumference of the seat tube 105. The quick release wire 265 forms a wire loop 267 and cable stop 269. The quick release wire 265 is coupled to the seat tube pull spring 130

Figure 17:
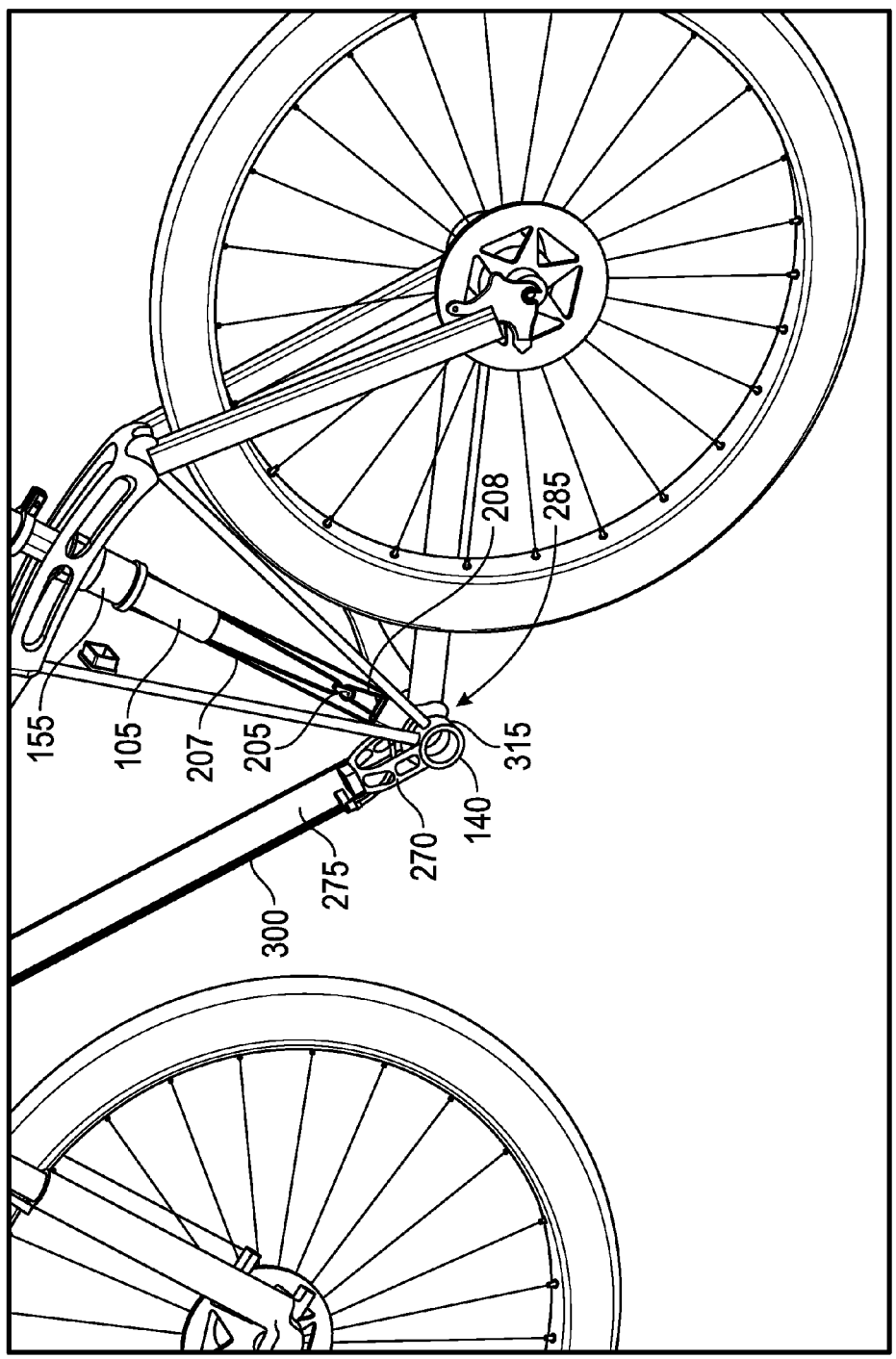
FIG. 17 is a perspective view of a portion of the bicycle frame of FIG. 13, with some components omitted for clarity.
Figure 18:
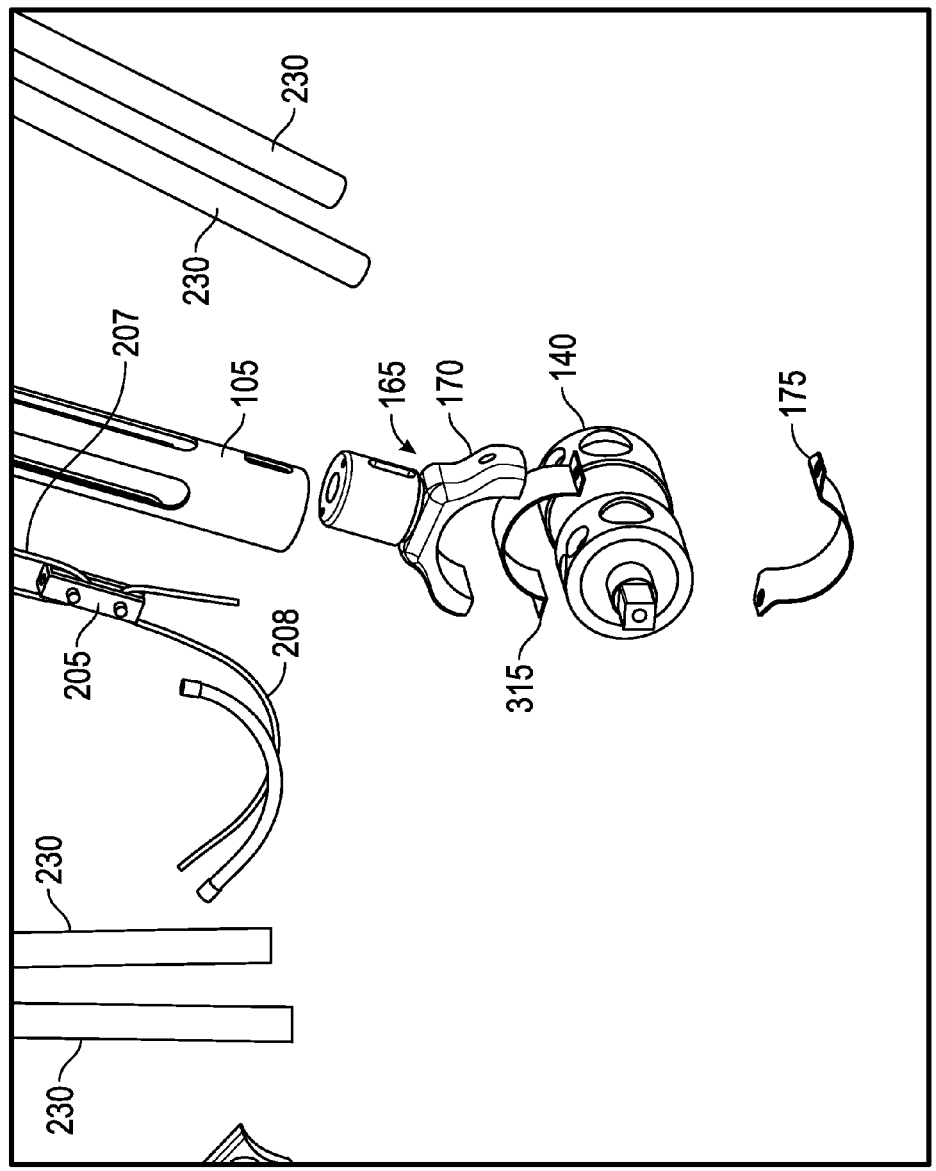
FIG. 18 is an exploded view of a portion of the bicycle frame of FIG. 13.

As shown in FIG. 17, a down tube yolk 270 is used to attach the down tube 275 to the bottom bracket 140 in a way that allows for clearance for the seat tube 105 to arc forward without obstruction. The seat tube pivot attachment 165 is attached to the bottom bracket 140 using a spring steel band 175 that allows for a smooth rotation of the seat tube assembly around the bottom bracket 140. The surfaces of the rotating parts can be easily lubricated through the opening at the top of the seat tube 105. A hardened steel, copper, or other bearing material 315 is used around the diameter of the bottom bracket 140 so that the lower clamping bracket 175 rides on a hardened surface acting as a bearing to prevent wear and noise.

Figure 19:
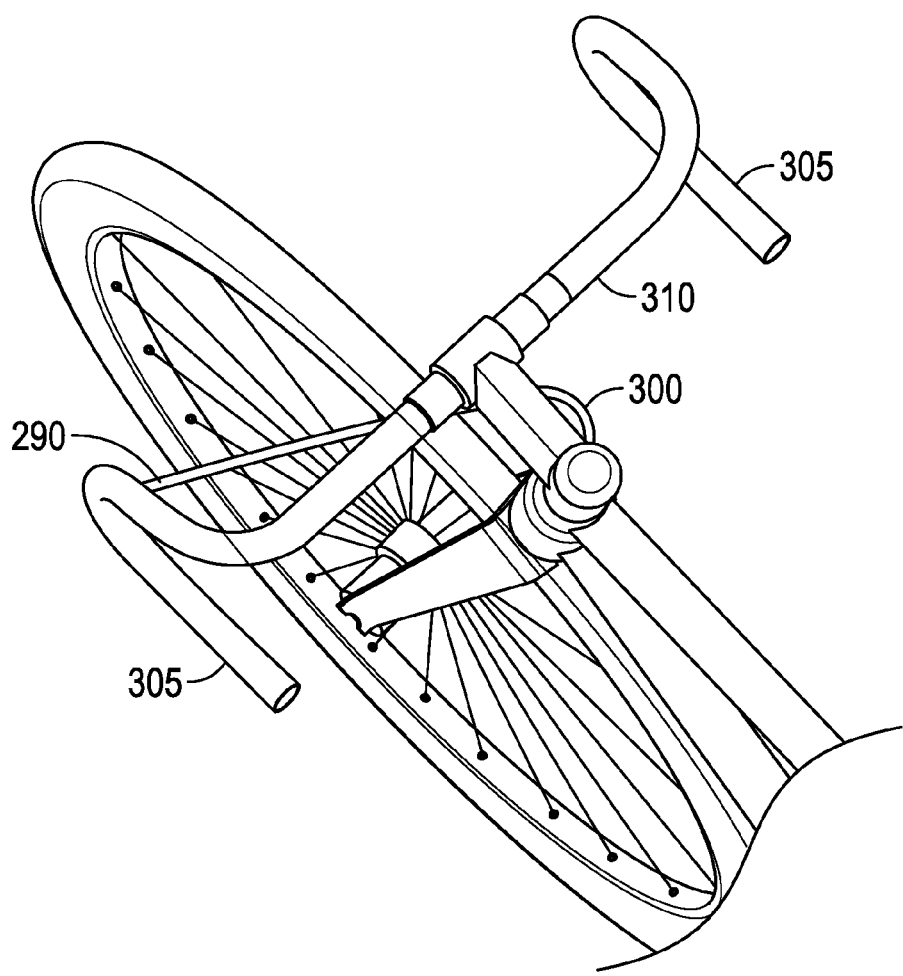
FIG. 19 is a perspective view of a portion of a bicycle according to an exemplary embodiment.

The road bikes (that includes the triathlon bike) use a cable seat release 290 (as shown in FIG. 19) instead of the thumb release 120 used on mountain bikes (e.g., as shown in FIGS. 1-2). The seat release cable 290 is an extension of the main cable 300 and spans between the curved sections 305 of the handlebars 310 with stops at the required positions. As shown in FIG. 19, for a bike with a road style drop handlebar 310, the lock ring release mechanism can be actuated using an extension 290 of the pull cable 300 that spans between two sections 305 of the bar 310.

Integrated into the seat tube assembly 145 is a hydraulic drop seat assembly 330 that may be used independently or simultaneously with the pivoting seat tube 105 to raise or lower the seat 335 as desired by the rider.

Because the bike frame 100 and seat tube assembly 145 are separate, the seat tube assembly 145 can maintain a fixed position with respect to gravity and the riders' body position while the rest of the frame 100 pivots at the bottom bracket 140 when desired. Because the seat tube assembly 145 can remain stationary while the remainder of the bike 115 follows the terrain, the rider maintains their maximum power position.

The construction and arrangement of the elements of the apparatus as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. The elements and assemblies may be constructed from any of a wide variety of materials that provide sufficient strength or durability, in any of a wide variety of colors, textures, and combinations. Additionally, in the subject description, any use of the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A bicycle seat tube assembly, comprising:
an arced component including a lower surface having a plurality of holes openings therein;
a bottom bracket positioned below the arced component;
a seat tube including a pivot attachment at a lower end of the seat tube, wherein the pivot attachment is coupled to the bottom bracket so that the arced component is movable relative to the seat tube about the bottom bracket, resulting in a plurality of seat tube positions between a fully forward position and a fully back position; and
a locking mechanism configured to selectively lock the seat tube to the arced component at one of the seat tube positions, wherein the locking mechanism includes a lock ring with a plurality of lock pins and a spring that biases the lock ring towards the arced component, wherein the lock ring is movable between a first position, in which the lock pins are inserted into the holes, and a second position, in which the lock pins are removed from the holes such that the lock pins do not inhibit the arced component from moving about the bottom bracket.

2. A bicycle seat tube assembly, comprising:
an arced component including a surface having a plurality of holes openings therein;
a bottom bracket positioned below the arced component;
a seat tube including a pivot attachment at a lower end of the seat tube, wherein the pivot attachment is coupled to the bottom bracket so that the arced component is movable relative to the seat tube about the bottom bracket, resulting in a plurality of seat tube positions between a fully forward position and a fully back position; and
a locking mechanism configured to selectively lock the seat tube to the arced component at one of the seat tube positions, wherein the locking mechanism includes a lock ring with a plurality of lock pins and a spring that biases the lock ring towards the arced component, wherein the lock ring is movable between a first position, in which the lock pins are inserted into the holes, and a second position, in which the lock pins are removed from the holes such that the lock pins do not inhibit the arced component from moving about the bottom bracket.

3. The bicycle seat tube assembly of claim 2, wherein the locking mechanism further includes a hydraulic assembly structured to selectively remove the lock pins from the holes.

4. The bicycle seat tube assembly of claim 3, wherein the locking mechanism abuts the arced component.

5. The bicycle seat tube assembly of claim 4, wherein the locking mechanism slides along the arced component when the arced component is moved relative to the seat tube.

6. The bicycle seat tube assembly of claim 5, wherein the arced component includes a bearing material, the locking mechanism abutting the bearing material.

7. The bicycle seat tube assembly of claim 5, wherein the locking mechanism provides support for the arced component when the seat tube is in any of the plurality of seat tube positions.

8. The bicycle seat tube assembly of claim 2, wherein the arced component is a first arced component, and further comprising an arc body including the first arced component and a second arced component.

* * * * *

UNITED STATES PATENT AND TRADEMARK OFFICE
CERTIFICATE OF CORRECTION

PATENT NO. : 9,511,810 B2  
APPLICATION NO. : 14/397257  
DATED : December 6, 2016  
INVENTOR(S) : Loren Lee Alan Page 1 of 1

It is certified that error appears in the above-identified patent and that said Letters Patent is hereby corrected as shown below:

Claim 1, Column 9, Line 4, "openings" should be deleted.

Claim 2, Column 9, Line 25, "openings" should be deleted.

Signed and Sealed this  
Twenty-second Day of May, 2018

Andrei Iancu  
*Director of the United States Patent and Trademark Office*